US011114118B2

(12) United States Patent
Akatsuka (10) Patent No.: US 11,114,118 B2
(45) Date of Patent: Sep. 7, 2021

(54) DISK DEVICE

(71) Applicants: Kabushiki Kaisha Toshiba, Tokyo (JP); Toshiba Electronic Devices & Storage Corporation, Tokyo (JP)

(72) Inventor: Naoto Akatsuka, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/936,907

(22) Filed: Jul. 23, 2020

(65) Prior Publication Data

US 2020/0357432 A1 Nov. 12, 2020

Related U.S. Application Data

(60) Continuation of application No. 16/811,650, filed on Mar. 6, 2020, now Pat. No. 10,762,921, which is a continuation of application No. 16/658,975, filed on Oct. 21, 2019, now Pat. No. 10,607,640, which is a division of application No. 15/998,870, filed on Aug. 17, 2018, now Pat. No. 10,490,217.

(30) Foreign Application Priority Data

Mar. 19, 2018 (JP) .............................. JP2018-051493

(51) Int. Cl.
*G11B 5/48* (2006.01)
(52) U.S. Cl.
CPC ................................. *G11B 5/4813* (2013.01)

(58) Field of Classification Search
CPC ................................. G11B 5/48; G11B 5/4813
USPC .............................................. 360/266–266.5
See application file for complete search history.

(56) References Cited

U.S. PATENT DOCUMENTS

| 5,218,496 | A | * | 6/1993 | Kaczeus | .............. | G11B 5/4813 |
| | | | | | | 360/246.8 |
| 5,317,559 | A | * | 5/1994 | Bronsvatch | .......... | G11B 21/083 |
| | | | | | | 360/264.3 |
| 5,727,882 | A | | 3/1998 | Butler et al. | | |
| 5,805,386 | A | | 9/1998 | Faris | | |
| 5,983,485 | A | | 11/1999 | Misso | | |

(Continued)

FOREIGN PATENT DOCUMENTS

JP S64-45354 U 3/1989
JP 2003-187540 A 7/2003

(Continued)

*Primary Examiner* — Allen T Cao
(74) *Attorney, Agent, or Firm* — White & Case LLP (57) ABSTRACT

According to one embodiment, a disk device includes a first actuator assembly and a second actuator assembly which are respectively supported by a first bearing unit and a second bearing unit to be rotatable about a support shaft. The first bearing unit includes a first sleeve and a ball bearing. The second bearing unit includes a second sleeve and a ball bearing. The first sleeve includes a first end surface opposed to the second sleeve and an annular first step projecting from the first end surface, and the second sleeve includes a second end surface opposed to the first step with a gap and an annular second step projecting from the second end surface. The second step is opposed to the first step and the first end surface with a gap.

8 Claims, 9 Drawing Sheets

(56) References Cited

U.S. PATENT DOCUMENTS

| | | | |
|---|---|---|---|
| 6,115,215 A * | 9/2000 | Adams | G11B 5/553 |
| | | | 360/264.4 |
| 6,371,654 B1 | 4/2002 | Misso | |
| 6,449,130 B1 | 9/2002 | Koyama | |
| 6,490,138 B1 * | 12/2002 | Prater | G11B 5/5521 |
| | | | 360/294.3 |
| 6,603,640 B1 * | 8/2003 | Prater | F16C 19/54 |
| | | | 360/264.4 |
| 6,678,120 B2 * | 1/2004 | Money | G11B 5/5521 |
| | | | 360/264.2 |
| RE38,662 E | 11/2004 | Elsasser et al. | |
| 6,847,504 B1 * | 1/2005 | Bennett | G11B 5/4833 |
| | | | 360/77.02 |
| 7,952,837 B1 | 5/2011 | Dobosz et al. | |
| 10,192,575 B1 | 1/2019 | Resh | |
| 2002/0039259 A1 | 4/2002 | Koyama et al. | |
| 2003/0021061 A1 | 1/2003 | Hall | |
| 2005/0146810 A1 * | 7/2005 | Mouri | F16C 35/067 |
| | | | 360/265.6 |
| 2007/0258670 A1 | 11/2007 | Akahori | |
| 2011/0188796 A1 | 8/2011 | Tsuchiya | |
| 2016/0013034 A1 | 1/2016 | De Bosscher et al. | |
| 2016/0118068 A1 | 4/2016 | Kaneko et al. | |
| 2016/0131190 A1 | 5/2016 | Tsuchiya et al. | |
| 2018/0358039 A1 | 12/2018 | Keshavan et al. | |

FOREIGN PATENT DOCUMENTS

| | | |
|---|---|---|
| JP | 2016-91588 A | 5/2016 |
| JP | 2018-26191 A | 2/2018 |

* cited by examiner

DISK DEVICE

CROSS-REFERENCE TO RELATED APPLICATIONS

This application is a continuation of application Ser. No. 16/811,650, filed Mar. 6, 2020, which is a continuation of application Ser. No. 16/658,975, filed Oct. 21, 2019, now patented U.S. Pat. No. 10,607,640, which is a divisional of application Ser. No. 15/998,870 filed on Aug. 17, 2018, now patented U.S. Pat. No. 10,490,217, and is based upon and claims the benefit of priority from Japanese Patent Application No. 2018-051493, filed Mar. 19, 2018, the entire contents of which are incorporated herein by reference.

FIELD

Embodiments described herein relate generally to a disk device including a head actuator assembly.

BACKGROUND

Hard disk drives (HDDs), as an example of a disk device, comprise, for example, a magnetic disk disposed in a casing, spindle motor configured to support and rotate the magnetic disk, actuator assembly supporting a magnetic head, voice coil motor configured to drive the actuator assembly, and flexible printed circuit unit (hereinafter referred to as FPC unit).

The actuator assembly comprises an actuator block including a plurality of arms and a unit bearing attached to an attachment hole of the actuator block. To each arm, one or two suspension assemblies supporting the magnetic head are attached. The unit bearing is, for example, a combination of two ball bearings and a spacer. The bearings are greased to reduce friction and wearing.

During a seek operation by the actuator assembly, grease or lubricant may be splashed from between inner and outer rings of the bearings. The splashing grease may be leaked or added to the magnetic disk and the magnetic head to cause insufficient flying and crushing of the magnetic head, and thereby results in a great problem such as read/write error. To prevent this, the upper part of the unit bearing is covered with a cap and the lower part thereof is covered with a shaft base to block splashing grease.

In recent years, storage capacity of HDD is increased, and accordingly, the number of magnetic disks disposed therein is increased. In order to deal with a number of magnetic disks, a so-called dual actuator assembly including two or more actuator assembles is proposed. In the dual actuator assembly, two unit bearings are disposed one-on-another in the axis direction with a spacer therebetween. In that case, a grease splashing space (gap) which is difficult to be adjusted by the cap and shaft base is formed between two unit bearings. Thus, grease splash from the unit bearings may possibly be increased.

DETAILED DESCRIPTION

Various embodiments will be described hereinafter with reference to the accompanying drawings. In general, according to one embodiment, a disk device comprises a disk shaped recording medium including a recording layer; a first actuator assembly including a first actuator block rotatably supported on a support shaft via a first bearing unit, a suspension assembly extending from the first actuator block, and a magnetic head supported by the suspension assembly; and a second actuator assembly including a second actuator block rotatably supported on the support shaft via a second bearing unit, a suspension assembly extending from the first actuator block, and a magnetic head supported by the suspension assembly. The first bearing unit comprises a first sleeve fixed to the first actuator block and located around the support shaft in a coaxial manner, and one or more ball bearings disposed between the support shaft and the first sleeve. The second bearing unit comprises a second sleeve fixed to the second actuator block and located around the support shaft in a coaxial manner, and one or more ball bearings disposed between the support shaft and the second sleeve. The first sleeve includes a first end surface opposed to the second sleeve, and an annular first step which projects from the first end surface and is located coaxial with the support shaft. The second sleeve includes a second end surface opposed to the first step with a gap therebetween, and an annular second step which projects from the second end surface and is located coaxial with the support shaft, wherein the second step overlaps the first step in a radial direction of the first sleeve and is opposed to the first step and the first end surface with a gap therebetween.

The disclosure is merely an example, and proper changes within the spirit of the invention, which are easily conceivable by a person with ordinary skill in the art, are included in the scope of the invention as a matter of course. In addition, in some cases, in order to make the description clearer, the widths, the thicknesses, the shapes, etc., of the respective parts are schematically illustrated in the drawings, compared to the actual modes. However, the schematic illustration is merely an example, and adds no restrictions on the interpretation of the present invention. Further, in the specification and drawings, the same elements as those described in connection with preceding drawings are given the same reference numbers, and a detailed description thereof is omitted as appropriate.

First Embodiment

A hard disk drive (HDD) according to a first embodiment as a disk drive will be explained.

Figure 1:
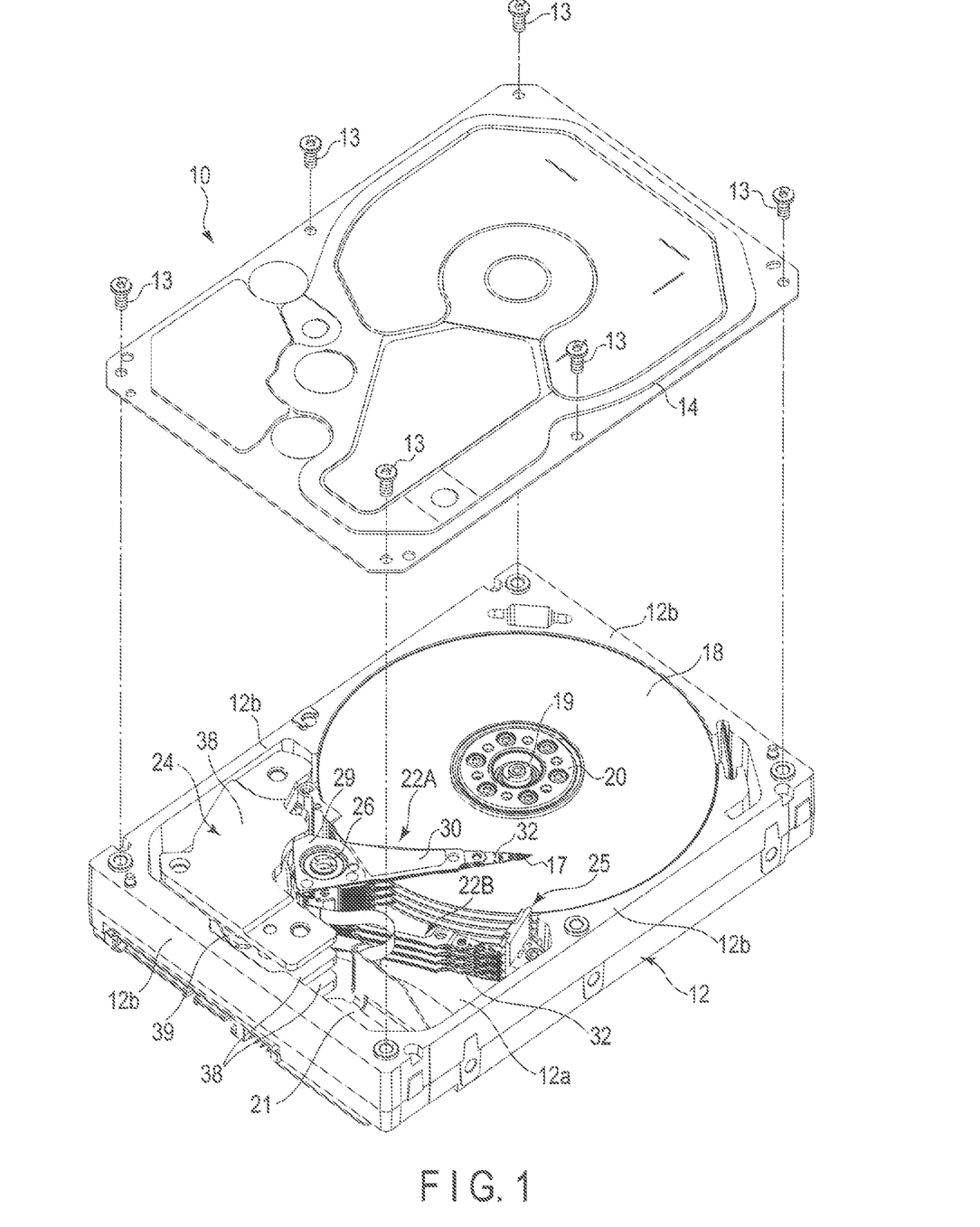
FIG. 1 is a perspective view of a hard disk drive (HDD) of a first embodiment with a top cover thereof detached.

FIG. 1 is a perspective view showing the HDD of the first embodiment with a top cover detached.

HDD comprises a flat and substantially rectangular casing 10. The casing 10 includes a rectangular box-shaped base 12 upper surface of which is opened and a top cover 14. The top cover 14 is fixed to the base 12 with a plurality of screws 13 to block the upper end opening of the base 12. The base 12 includes a rectangular bottom wall 12a opposed to the top cover 14 with a gap therebetween, and side walls 12b standing along the periphery of the bottom wall 12a. The bottom wall 12a and the side walls 12b are formed integrally of aluminum, for example. The top cover 14 is formed in a rectangular plate-shape with stainless, for example. The top cover 14 is fixed on the side walls 12b of the base 12 with screws to close the upper end opening of the base 12.

The casing 10 accommodates a plurality of magnetic disks 18 as recording media and spindle motor 19 which supports and rotates the magnetic disks 18. The spindle motor 19 is disposed on the bottom wall 12a. Each magnetic disk 18 is formed with a diameter of 88.9 mm (3.5 inch) and includes a magnetic recording layer in the upper surface and/or the lower surface thereof. Each magnetic disk 18 is fit to a hub (which is not shown) of the spindle motor 19 in a coaxial manner and is clamped by a clamp spring 20 to be fixed to the hub. Thus, each magnetic disk 18 is supported in a position parallel to the bottom wall 12a of the base 12. The magnetic disk 18 are rotated by the spindle motor 19 in a certain rotation rate.

Note that, as shown in FIG. 1, seven magnetic disks 18 are disposed in the casing 10 in the present embodiment; however, the number of the magnetic disks 18 is not limited thereto.

The casing 10 accommodates a plurality of magnetic heads 17 which record and resume data to/from the magnetic disk 18 and a head actuator assembly which supports the magnetic heads 17 in a movable manner with respect to the magnetic disk 18. In the present embodiment, the head actuator assembly is formed as a dual actuator assembly including a plurality of actuator assemblies such as a first actuator assembly 22A and a second actuator assembly 22B.

Furthermore, the casing 10 accommodates a voice coil motor (VCM) 24 which rotates and positions the first and second actuator assemblies 22A and 22B, a ramp loading mechanism 25 which keeps the magnetic heads 17 apart from the magnetic disk 18 in an unloaded position when the magnetic heads 17 move to the outermost periphery of the magnetic disk 18, and substrate unit (FPC unit) 21 on which electronic components such as a conversion connector are mounted.

On the outer surface of the bottom wall 12a of the base 12, a printed circuit board (not shown) is not shown is fixed with screws. The printed circuit board controls the operation of the spindle motor 19 and forms a controller which controls the operation of VCM 24 and magnetic heads 17 via the substrate unit 21.

Figure 2:
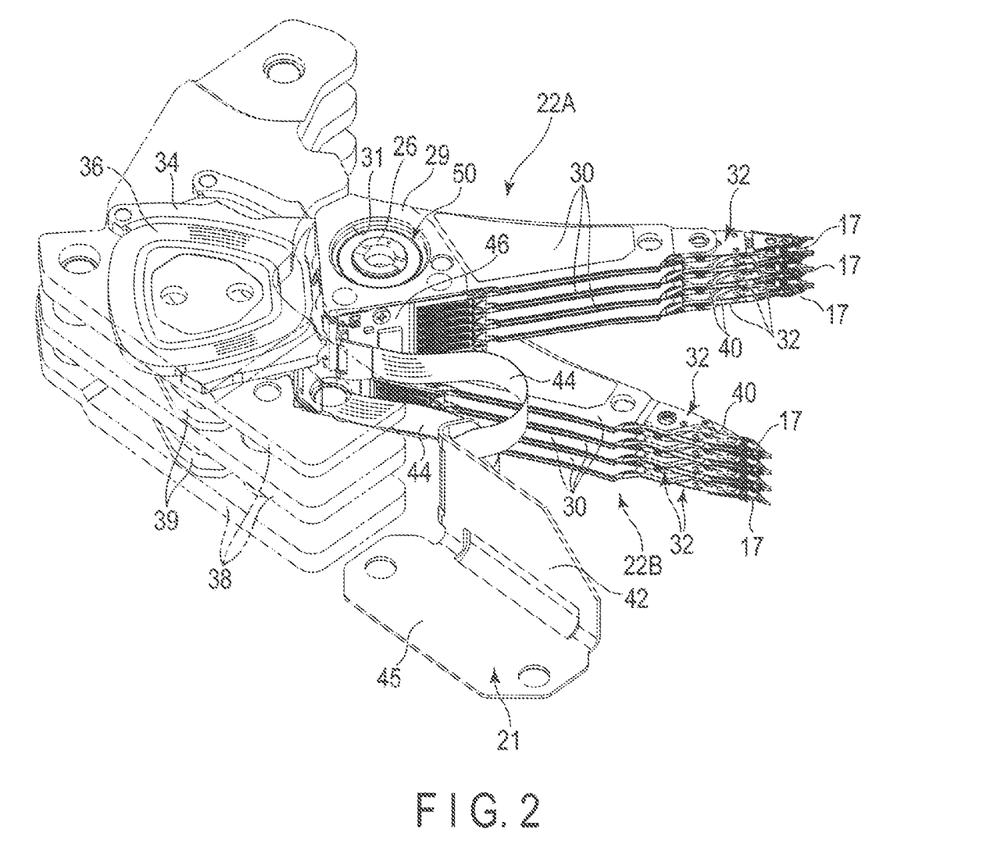
FIG. 2 is a perspective view of a head actuator assembly and a substrate unit of the HDD.
Figure 3:
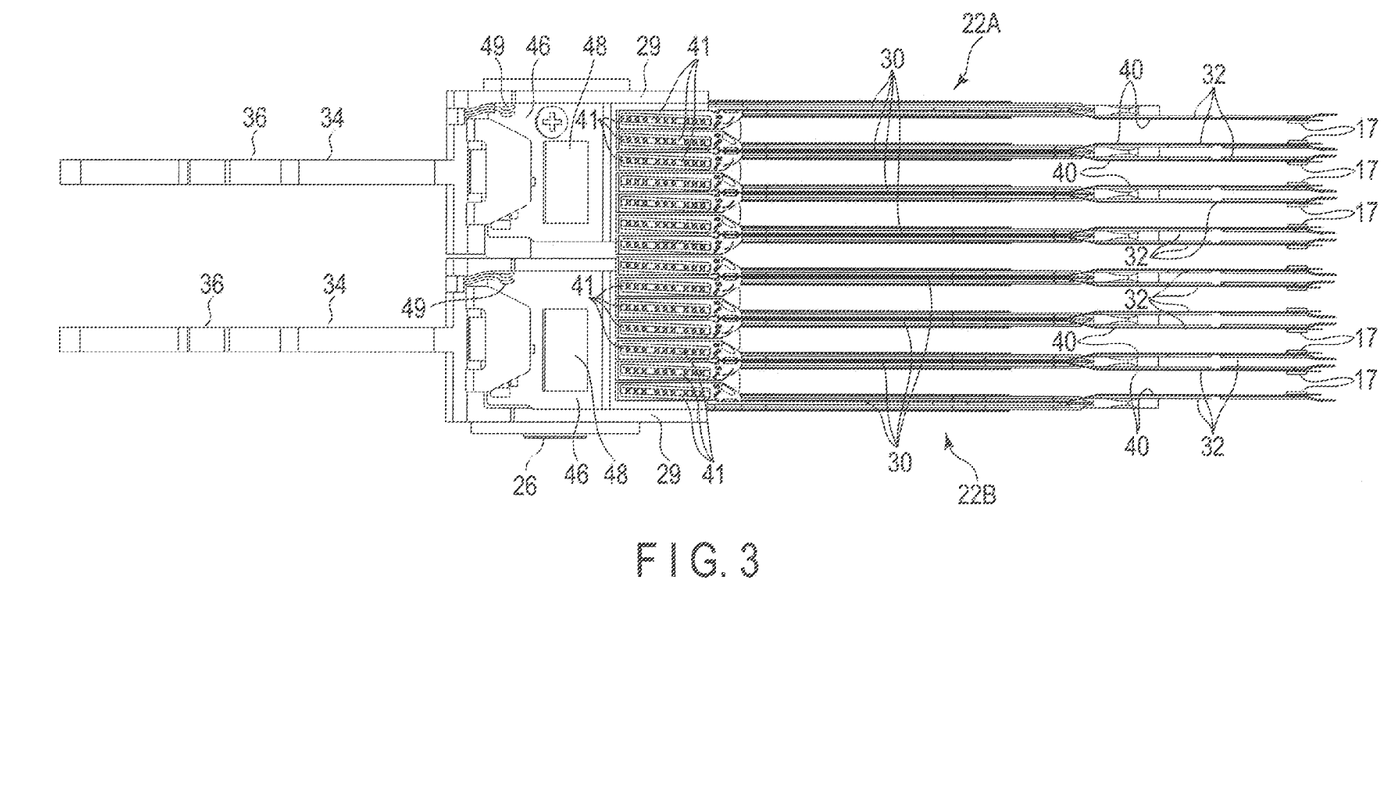
FIG. 3 is a cross-sectional view of the head actuator assembly.

FIG. 2 is a perspective view of a head actuator assembly including a dual actuator assembly and an FPC unit, and FIG. 3 is a side view of the dual actuator assembly. As shown in FIGS. 2 and 3, the dual actuator assembly comprises the first actuator assembly 22A and the second actuator assembly 22B. The first and second actuator assemblies 22A and 22B are layered, and furthermore, are provided to be independently rotatable around a common axis (support shaft) 26 which is disposed vertically on the bottom wall 12a of the base 12. The first and second actuator assemblies 22A and 22B are formed in substantially the same structure. In this example, the actuator assembly arranged on the upper side is the first actuator assembly 22A and the actuator assembly arranged on the lower side is the second actuator assembly 22B.

The first actuator assembly 22A comprises an actuator block (first actuator block) 29, four arms 30 extending from the actuator block 29, suspension assemblies 32 attached to each arm 30, and magnetic heads 17 supported by the suspension assemblies 32. The actuator block 29 includes an inner hole 31 and a bearing unit (unit bearing) 50, which will be described later, accommodated in the inner hole 31.

In the present embodiment, the actuator block 29 and four arms 30 are formed integrally with aluminum or the like, and form a so-called E block. The arm 30 is formed in a slender flat plate shape and extends in a direction orthogonal to the support shaft 26. Four arms 30 are provided in parallel to one another at certain intervals.

The first actuator assembly 22A includes a support frame 34 extending from the actuator block 29 in a direction opposite to the arms 30. A voice coil 36 which is a part of the VCM 24 is supported by the support frame 34. As shown in FIGS. 1 and 2, the voice coil 36 is positioned between a pair of yokes disposed in the base 12 and forms the VCM 24 with the yokes 38 and a magnet 39 fixed to one of the yokes 38.

As shown in FIGS. 2 and 3, the first actuator assembly 22A includes seven suspension assemblies 32 which are attached to extending ends of the arms 30. The suspension assemblies 32 include up-head suspension assemblies supporting the magnetic heads 17 upwardly and down-head suspension assemblies supporting the magnetic head 17 downwardly. The up-head suspension assembly and the down-head suspension assembly have the same structure while the former one faces upward and the latter one faces downward. In the present embodiment, a down-head suspension assembly 32 is attached to the uppermost arm 30, and an up-head suspension assembly 32 and a pair of the up-head and down-head suspension assemblies is attached to each of the other three arms 30.

Each suspension assembly 32 comprises a substantially rectangular base plate, load beam formed of a plate spring, and a band-shaped flexure (wiring member) 40. The flexure 40 is attached to the surface of the load beam and the base plate and extends from the side edge of the base plate outwardly along the arm 30 to the proximal end of the arm 30 (actuator block 29). A displaceable gimbal (elastic supporter) is provided at the distal end of the flexure 40 positioned on the load beam, and the magnetic head 17 is mounted on the gimbal. The wirings of flexure 40 are electrically connected to the magnetic head 17. Note that the magnetic head 17 includes a write element and a read element which are not shown.

The flexure 40 include a connection end 41 provide with the extending end. The connection end 41 is provided with a plurality of connection terminals which are not shown. The connection end 41 is connected to the FPC provided on the side surface of the actuator block 29, which will be described later.

On the other hand, the second actuator assembly 22A is formed similarly to the first actuator assembly 22A. That is, the second assembly 22B comprises an actuator block (second actuator block) 29 including a bearing unit (second bearing unit) 50, four arms 30 extending from the actuator block 29, seven suspension assemblies 32 attached to the arms 30, the magnetic heads 17 supported by the suspension assemblies 32, and voice coil 36 attached to a support frame 34. In the second actuator assembly 22B, an up-head suspension assembly 32 is attached to the lowermost arm 30, and a pair of up-head and down-head suspension assemblies 32 are attached to each of the other three arms 30. The second actuator assembly 22B is rotatably supported by the support shaft 26 via the bearing unit 50. Furthermore, the voice coil 36 of the second actuator assembly 22B is positioned between a pair of yokes 38 disposed in the base 12 and forms the VCM 24 with the yokes 38 and a magnet 39 fixed to one of the yokes 38.

Note that the VCM 24 driving the first actuator assembly 22A and the VCM 24 driving the second actuator assembly 22B are provided independently. Thus, the first actuator assembly 22A and the second actuator assembly 22B can drive (rotate) independently.

As shown in FIG. 2, the FPC unit 21 includes, integrally, a substantially rectangular base 42, two band-shaped relays 44 extending from one side edge of the base 42, and two joint portions 46 provided successively at the distal ends of the relays 44. The base 42, relays 44, and joint portions 46 are formed of flexible printed circuit board (FPC). The flexible printed circuit board includes an insulating layer formed of polyimide or the like, a conductive layer formed on the insulating layer to form a plurality of wirings, connection pads, and the like, and a protection layer covering the conductive layer.

On the base 42, electronic components such as a conversion connector and a plurality of condensers which are not shown are mounted and are electrically connected to the wirings which are not shown. A metal plate 45 functioning as a reinforcement plate is added to the base 42. Two relays 44 extend from the side edge of the base 42 to the first and second actuator assemblies 22A and 22B. The joint portion 46 provided at the extending end of the relay 44 is each adhered to one side surface (mount surface) of the actuator block 29 via a backing plate which is not shown, and furthermore, is fixed to the amount surface with fixation screws.

As shown in FIGS. 2 and 3, the connection end 41 of the flexure 40 is connected to each joint portion 46 and is electrically connected to the wirings of the joint portion 46. A head IC (head amplifier) 48 is mounted on the joint portion 46 and the head IC 48 is connected to the connection end 41 and the base 42 via the wirings. Furthermore, the joint portion 46 includes a connection pad 49 to which the voice coil 36 is connected.

The seven magnetic heads 17 of the first actuator assembly 22A are each electrically connected to the base 42 via the wirings of the flexure 40, the connection end 41, the joint portion 46 of the FPC unit 21, and the relay 44. Similarly, the seven magnetic heads 17 of the second actuator assembly 22B are each electrically connected to the base 42 via the wirings of the flexure 40, the connection end 41, the joint portion 46 of the FPC unit 21, and the relay 44. Furthermore, the base 60 is electrically connected to the printed circuit board on the bottom surface side of the casing 10 via the conversion connector.

Figure 4:
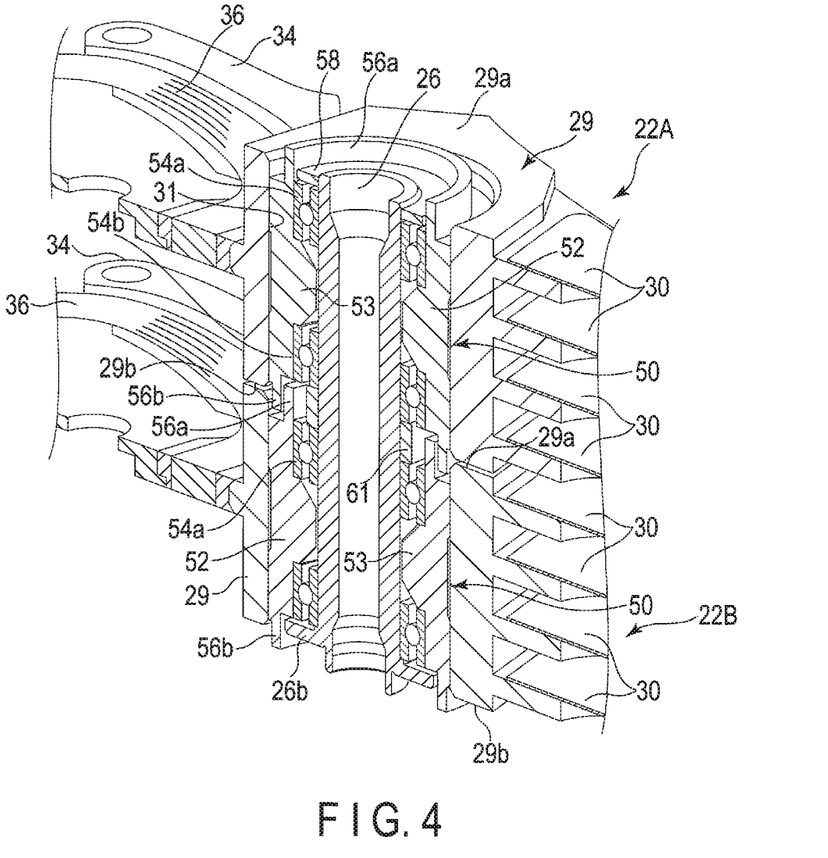
FIG. 4 is a perspective view of an actuator block of the head actuator assembly in a partly broken manner.
Figure 5:
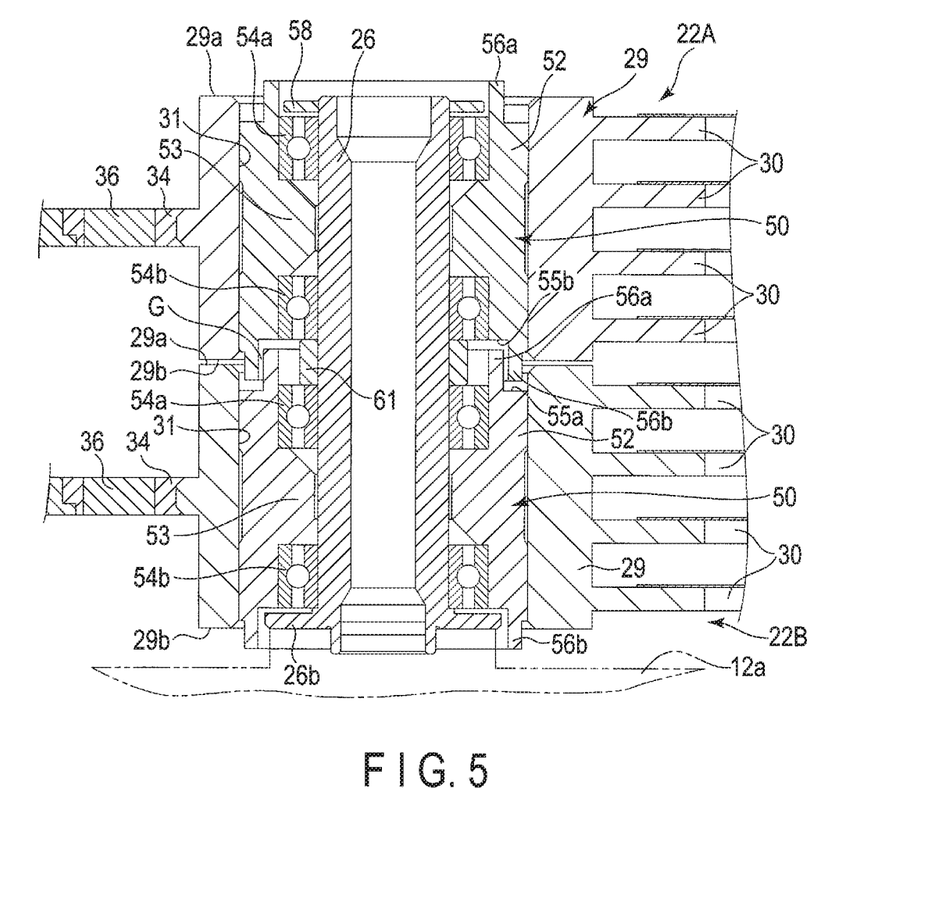
FIG. 5 is a cross-sectional view of the actuator block of the head actuator assembly.

Then, the bearing unit of the first actuator assembly 22A and the second actuator assembly 22B will be explained. FIG. 4 shows the actuator block and the bearing unit in a partly broken manner, and FIG. 5 is a cross-sectional view of the actuator block and the bearing unit.

As shown, the actuator block 29 of each of the actuator assemblies 22A and 22B includes an upper end surface 29a and a lower end surface 29b which are orthogonal to the support shaft 26. The inner hole 31 is formed to penetrate through the actuator block 29 and opens to the upper end surface 29a and the lower end surface 29b. The inner hole 31 is formed coaxially with the support shaft 26.

The bearing unit 50 comprises a substantially cylindrical-shaped sleeve (first sleeve) 52 and a pair of ball bearings 54a and 54b fit in the sleeve 52. The sleeve 52 has a length in an axis direction, which is substantially the same as the height of the actuator block 29. The outer diameter of the sleeve 52 is set to be substantially the same as the diameter of the inner hole 31. The inner diameter of the sleeve 52 is formed greater than the diameter of the support shaft 26. The sleeve 52 includes, integrally, an annular projection 53 projecting from the middle part of the inner peripheral surface of the sleeve 52 toward the center of the axis. The sleeve 52 includes an annular first rib (first step) 56a projecting from one end surface in the axis direction which is the upper end surface (first end surface 55a) in this example, and an annular second rib (second step) 56b projecting from the other end surface in the axis direction which is the lower end surface (second end surface 55b) in this example. The first rib 56a is disposed coaxially with the sleeve 52 and has an inner diameter substantially the same as the inner diameter of the sleeve 52. The second rib 56b is disposed coaxially with the sleeve 52 and has an inner diameter slightly larger than the outer diameter of the first rib 56a. The outer diameter of the second rib 56b is formed slightly smaller than the outer diameter of the sleeve 52.

One ball bearing 54a is disposed in the upper end part of the sleeve 52 while the outer race thereof is fit in the inner peripheral surface of the sleeve 52. The other ball bearing 54b is disposed in the lower end part of the sleeve 52 while the outer race thereof is fit in the inner peripheral surface of the sleeve 52. The projection 53 is positioned between the ball bearings 54a and 54b and functions as a spacer.

The sleeve 52 of the bearing unit 50 structured as above is fit in the inner hole 31 of the actuator block 29 and is fixed to the actuator block 29 with an adhesive agent or the like. The sleeve 52 is positioned coaxially with the inner hole 31, and the first rib 56a projects upwardly from the upper end opening of the inner hole 31. The second rib 56b projects downwardly from the lower end opening of the inner hole 31.

The bearing unit (first bearing unit) 50 of the first actuator assembly 22A and the bearing unit (second bearing unit) 50 of the second actuator assembly 22B have the same structure.

The support shaft 26 is formed in a hollow cylindrical shape and includes an annular flange 26b formed on the outer periphery of the proximal end thereof. The support shaft 26 is mounted on the bottom wall 12a of the base 12 such that the flange 26b contacts a boss part of the bottom wall 12a. The support shaft 26 is vertically fixed to the bottom wall 12a with a fixation bolt which is not shown but is inserted through the upper end opening of the support shaft 26 into the bottom wall 12a.

The second actuator assembly 22B is rotatably supported on the proximal end part of the support shaft 26 via the bearing unit 50. That is, the proximal end part of the support shaft 26 is inserted into the bearing unit 50 and the inner race of the ball bearings 54a and 54b fit the outer peripheral surface of the support shaft 26. The lower side ball bearing 54b is opposed to the flange 26b of the support shaft 26 with a slight gap therebetween. Thus, the flange 26b can function as a cover preventing splash or leakage of grease (lubricant) from the ball bearing 54b.

The first actuator assembly 22A is rotatably supported on the distal end part of the support shaft 26 via the bearing unit 50. That is, the distal end part of the support shaft 26 is inserted into the bearing unit 50 and the inner race of the ball bearings 54a and 54b fit the outer peripheral surface of the support shaft 26. An annular spacer ring 61 is fitted to the outer periphery of the middle part of the support shaft 26 in the axis direction. The spacer ring 61 is interposed between the upper ball bearing 54a of the second actuator assembly 22B and the lower ball bearing 54b of the first actuator assembly 22A. With the spacer ring 61, the upper and lower bearing units 50, that is, the first and second actuator assemblies 22A and 22B are maintained with a certain gap therebetween.

Note that an annular cap 58 is attached to the outer periphery of the upper end of the support shaft 26. The cap 58 is opposed to the upper ball bearing 54a with a slight gap therebetween. Thus, the cap 58 functions as a cover which prevents splash of grease from the bass bearing 54a.

Hereinafter, the structural elements of the first actuator assembly 22A will be referred to with "first" before them, and the structural elements of the second actuator assembly 22B will be referred to with "second" before them.

As shown in FIGS. 4 and 5, the lower end surface 29b of the first actuator block 29 and the upper end surface 29a of the second actuator block 29 are opposed to each other in parallel while a slight gap is maintained therebetween.

The first sleeve 52 of the first bearing unit 50 and the second sleeve 52 of the second bearing nit 50 are disposed coaxially and are layered with a slight gap therebetween. The first rib 56a of the second sleeve 52 is slid into the inner peripheral side of the second rib 56b of the first sleeve 52, and the first and second ribs 56a and 56b overlap in a radial direction of the sleeve, that is, are disposed aside in the radial direction. The first rib 56a is opposed to the lower end surface (second end surface) 55b of the first sleeve 52 and the inner peripheral surface of the second rib 56b with a slight gap between.

The second rib 56b of the first sleeve 52 is disposed on the outer peripheral side of the first rib 56a of the second sleeve 52, and furthermore, projects into the inner hole 31 of the second actuator block 29. The second rib 56b is opposed to the upper end surface (first end surface) 55a of the second sleeve 52 and the outer peripheral surface of the first rib 56a with a slight gap therebetween, and furthermore, is opposed to the inner peripheral surface of the inner hole 31 of the second actuator block 29 with a slight gap therebetween.

Figure 6:
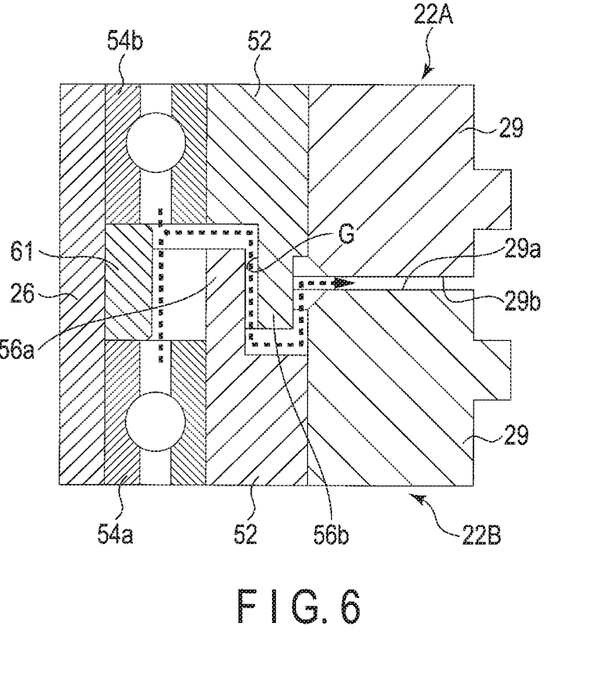
FIG. 6 is a cross-sectional view showing a gap between bearing units in an enlarged manner.

As above, a gap G of stepped-shape or of labyrinth-shape which extends in the radial direction and the axis direction alternately is defined by the first rib 56a and the second rib 56b between the upper and lower bearing units 50. The gap G communicates with the gap between the upper and lower actuator blocks 29. FIG. 6 is a schematic cross-sectional view showing the gap G in a partly enlarged manner. As shown, grease leaking from two ball bearings 54a and 54b adjacent to the boundary of the first and second bearing units 50 must pass through the gap G, as shown with a dotted line in the figure, to reach the gap between the upper and lower actuator blocks 29. As described above, the gap G as a passage of the grease (lubricant) is formed in a cranking manner or in a labyrinth-shape. That is, the gap G forms a long and complicated passage. Thus, the grease does not smoothly flow through the gap G and the amount of grease reaching the gap between the actuator blocks 29 significantly decrease. Thus, leakage and splashing grease from the boundary between the upper and lower actuator blocks 29 can be prevented. As described above, the gap G of a cranking manner or in a labyrinth-shape constitutes a seal structure which suppresses leakage of lubricant from the bearing unit to the outside of the first and second actuator blocks.

As shown in FIG. 1, while the head actuator assemblies structured as above are incorporated in the casing, the support shaft 26 is fixed to the bottom wall 12a and is disposed to be basically in parallel to the spindle of the spindle motor 19. Each magnetic disk 18 is disposed between the suspension assemblies 32. When the HDD is operated, the first and second actuator assemblies 22A and 22B are rotated independently from each other or integrally with each other, and the magnetic heads 17 attached to the suspension assembly 32 is opposed to the upper surface and the lower surface of the magnetic disk 18. The base 42 of the FPC unit 21 is fixed to the bottom wall 12a of the base 12.

In the HDD and the actuator assembly structured as above, while a plurality of actuator assemblies which can independently drive are layered, grease leaking from bearings of the bearing unit 50 and splashing out can be suppressed and adhesion of grease to magnetic disks or magnetic heads can be prevented. Thus, a problem caused by adhesion of grease can be prevented and the HDD and the head actuator assembly of great credibility can be achieved. Furthermore, the bearing units of the first and second actuator assemblies can have the same structure, and thus, the number of components of the actuator assembly can be reduced and the production costs can also be reduced.

Note that, in the first embodiment, the lower first rib 56a is positioned in the inner periphery side of the upper second rib 56b in the boundary of the upper and lower sleeves 52; however, no limitation is intended thereby. For example, the first and second ribs may be structured such that the lower first rib 56a is positioned on the outer peripheral side of the upper second rib 56b. Furthermore, a gap of stepped-shape or labyrinth-shape can be defined between the actuator blocks 29 with similar first and second ribs as above.

Then, an HDD and a head actuator assembly of another embodiment will be explained. In the following embodiment, structural elements as in the first embodiment will be referred to by the same reference numbers and detailed description thereof may be omitted or simplified to focus on differences from the first embodiment.

Second Embodiment

Figure 7:
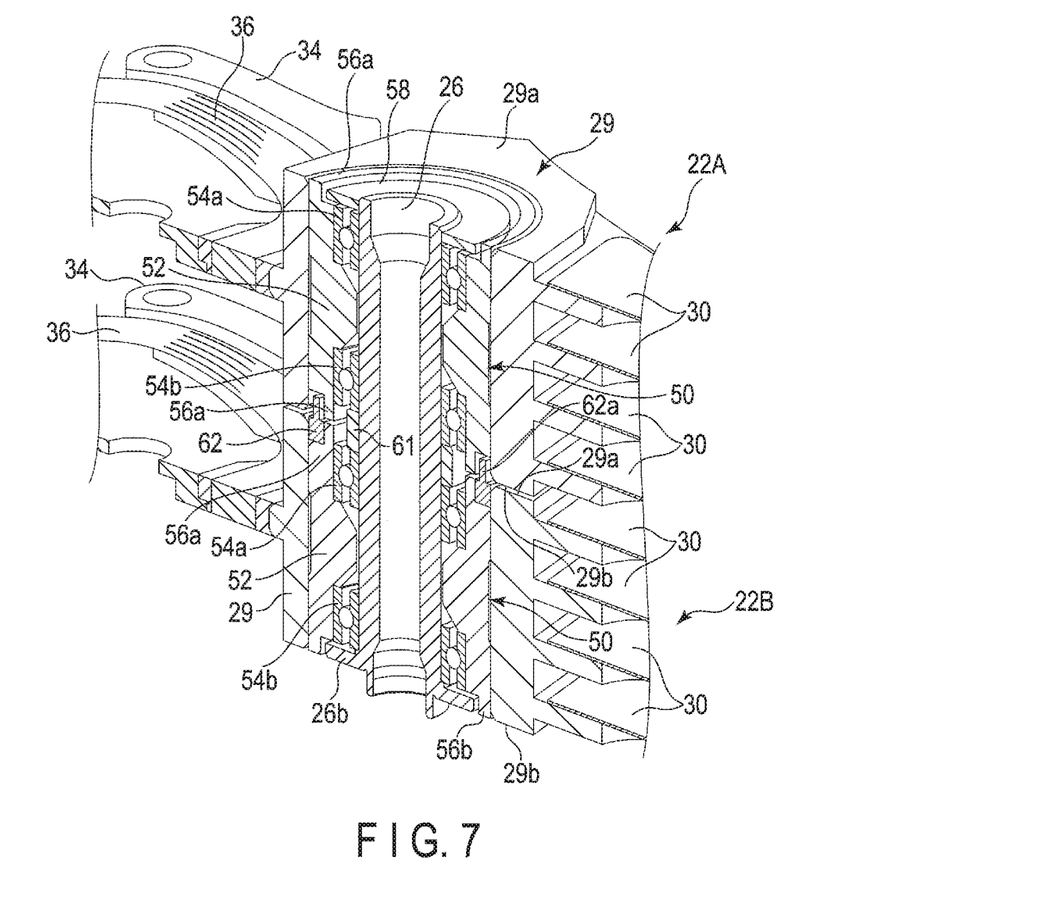
FIG. 7 is a perspective view of an actuator block of a head actuator assembly in an HDD of a second embodiment.
Figure 8:
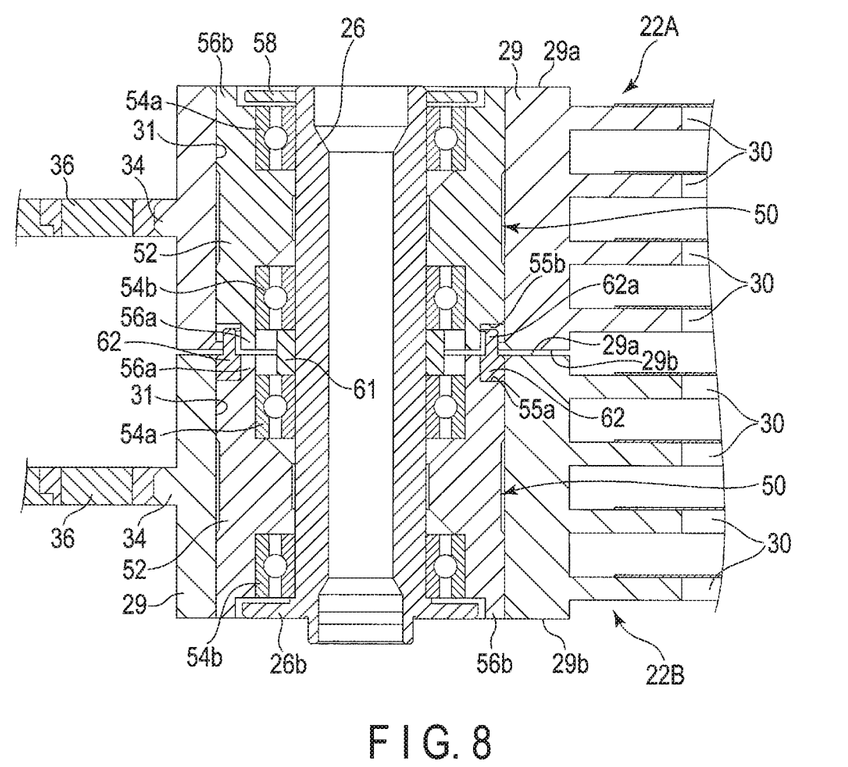
FIG. 8 is a cross-sectional view of the actuator block of the head actuator assembly.
Figure 9:
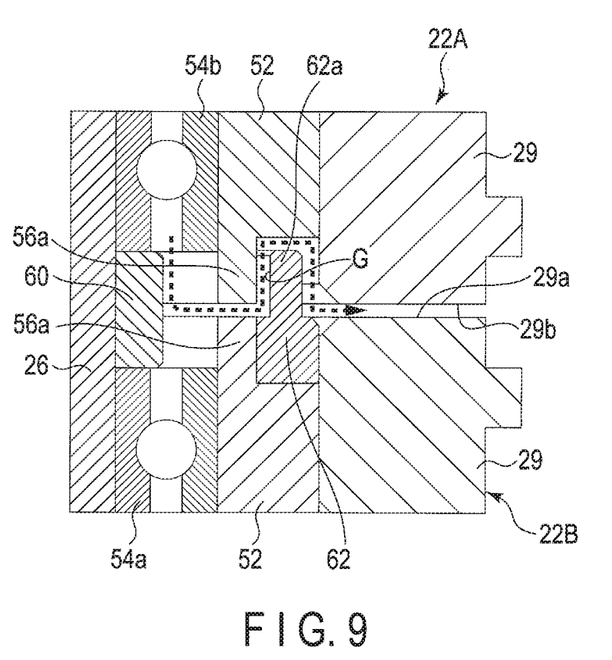
FIG. 9 is a cross-sectional view of a gap between the bearing units in an enlarged manner.

FIG. 7 is a perspective view of an actuator block of a head actuator assembly of HDD of the second embodiment where the actuator block is shown in a partly broken manner. FIG. 8 is a cross-sectional view of the actuator block of the head actuator assembly. FIG. 9 is a schematic cross-sectional view of a gap between bearing units.

In the second embodiment, in the head actuator assembly, a boundary between upper and lower bearing units has a structure different from that of the first embodiment. As shown in FIGS. 7 and 8, in the second embodiment, a sleeve 52 of each bearing unit 50 includes, integrally, an annular first rib (first step) 56a projecting from one end surface thereof in the axis direction and an annular second rib (second step) 56b projecting from the other end surface thereof in the axis direction. The first rib 56a is provided coaxially with the sleeve 52 and has substantially the same inner diameter as the inner diameter of the sleeve 52. The first rib 56a has an outer diameter smaller than the outer diameter of the sleeve 52. The second rib 56b is provided coaxially with the sleeve 52 and has an inner diameter slightly greater than the outer diameter of the first rib 56a. The outer diameter of the second rib 56b is formed to be substantially the same outer diameter of the sleeve 52.

A second sleeve 52 of the second actuator assembly 22B is attached to a second actuator block 29 while the first rib 56a is located on the upper end side of the sleeve 52 and the second rib 56b is located on the lower end side thereof. A first sleeve 52 of the first actuator assembly 22A is arranged upside down with respect to the second sleeve 52, and thus, the first rib 56a is located on the lower end side of the second sleeve 52 and the second rib 56b is located on the upper end side thereof. Thus, the first rib 56a of the first sleeve 52 and the first rib 56a of the second sleeve 52 are opposed to each other in the axis direction with a slight gap therebetween.

As shown in FIGS. 7, 8, and 9, an annular gap forming member (ring) 62 is attached to the first sleeve 52 or the second sleeve 52. In the present embodiment, the ring 62 is fixed to the upper end of the second sleeve 52 on the outer periphery side of the first rib 56a. The ring 62 has an inner diameter which is substantially the same as the outer diameter of the first rib 56a and an outer diameter which is substantially the same as the outer diameter of the second sleeve 52. The ring 62 fit the outer periphery of the first rib 56a and is substantially flush with the outer peripheral surface of the second sleeve 52. The upper half area of the ring 62 in the axis direction is formed to be narrower than the lower half area and constitutes an annular projection 62a. The projection 62a projects upward from the upper end surface of the second sleeve 52, that is, toward the first sleeve 52. The projection 62a overlaps the first rib 56a of the first sleeve 52 in a radial direction, that is, the projection 62a and the first rib 56a are positioned aside in the radial direction. Furthermore, the projection 62a is opposed to the lower end surface of the first sleeve 52, outer peripheral surface of the first rib 56a, and inner peripheral surface of the inner hole 31 of the first actuator block 29 with a slight gap therebetween.

As above, a gap G of stepped-shape or of labyrinth-shape which extends in the radial direction and the axis direction alternately is defined by the first rib 56a and the ring 62 between the upper and lower bearing units 50. The gap G communicates with the gap between the upper and lower actuator blocks 29. As shown in FIG. 9, grease leaking from two ball bearings 54a and 54b adjacent to the boundary of the first and second bearing units 50 must pass through the gap G to reach the gap between the upper and lower actuator blocks 29. As described above, the gap G as a passage of the grease is formed in a cranking manner or in a maze-like shape. Thus, the grease does not smoothly flow through the gap G and the amount of grease reaching the gap between the actuator blocks 29 significantly decrease. Thus, splashing grease from the boundary between the upper and lower actuator blocks 29 can be prevented.

As explained above, in the second embodiment, the ring 62 as an independent element is attached to the sleeve 52 to function as a rib. In the second embodiment, other components of the head actuator assembly are the same as those of the head actuator assembly explained in the first embodiment. In the second embodiment structured as above, a problem caused by adhesion of grease can be prevented and the HDD and the head actuator assembly of great credibility can be achieved. Furthermore, the bearing units of the first and second actuator assemblies can have the same structure except for the ring 62, and thus, the number of components of the actuator assembly can be reduced and the production costs can also be reduced.

Note that, in the second embodiment, the ring 62 is disposed on the outer periphery of the lower first rib 56a in the boundary of the upper and lower sleeves 52; however, no limitation is intended thereby. For example, the ring 62 may be disposed on the outer periphery of the upper first rib 56a. Furthermore, the first rib 56a may be located on the outer periphery side of the sleeve 52 and the ring 62 may be disposed on the inner periphery side of the first rib 56a.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiments, a gap between upper and lower bearing units opposed to each other is formed in a stepped-shape or a labyrinth-shape by combining a first rib provided with one sleeve and a second rib or a ring provided with the other sleeve. Or, for example, a gag G of further complicated shape may be defined by a plurality of annular ribs (steps) which are apart from each other in a radial direction provided with sleeves wherein the ribs of one sleeve come between the ribs of the other sleeve with gaps therebetween.

Furthermore, the actuator assembly is not limited to the above first and second assemblies, and three or more actuator assemblies may be rotatably supported on a common axis. In that case, the aforementioned gap of stepped-shape or labyrinth-shape may be provided with a gap between adjacent the upper and lower sleeves.

The number of the magnetic disks is not limited to seven, and it may be six or less, or may be eight or more. The number of the suspension assemblies and the number of magnetic heads can be increased depending on the number of disks adopted.

What is claimed is:

1. A disk device comprising:
a rotatable disk shaped recording medium;
a first actuator assembly including a first actuator block rotatably supported on a support shaft via a first bearing unit, a suspension assembly extending from the first actuator block, and a first magnetic head supported by the suspension assembly;
a second actuator assembly including a second actuator block rotatably supported on the support shaft via a second bearing unit, a suspension assembly extending from the second actuator block, and a second magnetic head supported by the suspension assembly; and
a seal structure located between the first actuator block and the second actuator block and configured to suppress leakage of lubricant from the first and second bearing units.

2. The disk device of claim 1, wherein
the seal structure includes a gap formed in a cranking manner of in a labyrinth-shape between the first actuator block and the second actuator block.

3. A disk device comprising:
a rotatable disk shaped recording medium;
a first actuator assembly including a first actuator block rotatably supported on a support shaft via a first bearing unit, a suspension assembly extending from the first actuator block, and a first magnetic head supported by the suspension assembly, the first bearing unit comprising a first sleeve fixed to the first actuator block and located around the support shaft in a coaxial manner, and one or more ball bearings disposed between the support shaft and the first sleeve;
a second actuator assembly including a second actuator block rotatably supported on the support shaft via a second bearing unit, a suspension assembly extending from the second actuator block, and a second magnetic head supported by the suspension assembly, the second bearing unit comprising a second sleeve fixed to the second actuator block and located around the support shaft in a coaxial manner, and one or more ball bearings disposed between the support shaft and the second sleeve; and a seal structure located between the first sleeve and the second sleeve.

4. The disk device of claim 3, wherein the first sleeve includes a first end surface opposed to the second sleeve, and an annular first step which projects from the first end surface and is located coaxial with the support shaft, the second sleeve includes a second end surface opposed to the first step with a gap therebetween, and an annular second step which projects from the second end surface and is located coaxial with the support shaft, wherein the second step overlaps the first step in a radial direction of the first sleeve and is opposed to the first step and the first end surface with a gap therebetween, and the seal structure includes the gap between the first step and the second end surface, the gap between the first step and the second step, and the gap between the second step and the first end surface.

5. The disk device of claim 3, wherein the first sleeve includes a first end surface opposed to the second sleeve, the second sleeve includes a second end surface opposed to the first end surface with a gap therebetween, and the seal structure includes an annular rib provided on at least one of the first end surface and the second end surface.

6. The disk device of claim 5, wherein the seal structure includes annular ribs each provided on the first end surface and the second end surface, and the annular rib of the first end surface overlaps the annular rib of the second end surface with a gap in a radial direction of the first sleeve.

7. The disk device of claim 6, wherein the seal structure includes a gap of a labyrinth-shape between the first end surface and the second end surface.

8. The disk device of claim 3, wherein the first sleeve includes a first end surface opposed to the second sleeve, the second sleeve includes a second end surface opposed to the first end surface with a gap therebetween, and at least a part of the second sleeve overlaps at least a part of the first sleeve in a radial direction of the first sleeve.

\* \* \* \* \*